US008793239B2

(12) United States Patent  (10) Patent No.: US 8,793,239 B2
Dalvi et al.  (45) Date of Patent: Jul. 29, 2014

(54) METHOD AND SYSTEM FOR FORM-FILLING CRAWL AND ASSOCIATING RICH KEYWORDS

(75) Inventors: Nilesh Dalvi, Menlo Park, CA (US); Raghu Ramakrishnan, Los Altos, CA (US); Vinay Kakade, Sunnyvale, CA (US); Arup Kumar Choudhury, Karnataka (IN); Sathiya Keerthi Selvaraj, Cupertino, CA (US); Philip Bohannon, Cupertino, CA (US); Mani Abrol, Karnataka (IN); David Ciemiewicz, Mountain View, CA (US); Arun Shankar Iyer, Karnataka (IN); Vipul Agarwal, Karnataka (IN); Alok S. Kirpal, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 299 days.

(21) Appl. No.: 12/576,011

(22) Filed: Oct. 8, 2009

(65) Prior Publication Data

US 2011/0087646 A1  Apr. 14, 2011

(51) Int. Cl.
  *G06F 17/30* (2006.01)
  *G06F 7/00* (2006.01)

(52) U.S. Cl.
  USPC .......................................... 707/709; 707/737

(58) Field of Classification Search
  USPC .................................................. 707/709, 710
  See application file for complete search history.

(56) References Cited

U.S. PATENT DOCUMENTS

| | | | |
|---|---|---|---|
| 6,424,971 B1 | 7/2002 | Kreulen et al. | |
| 6,654,741 B1 * | 11/2003 | Cohen et al. | 707/999.004 |
| 6,882,999 B2 * | 4/2005 | Cohen et al. | 707/694 |
| 6,950,821 B2 * | 9/2005 | Faybishenko et al. | 707/688 |
| 7,054,855 B2 * | 5/2006 | Basso et al. | 707/999.003 |
| 7,379,932 B2 * | 5/2008 | Agrawal et al. | 707/710 |
| 7,519,902 B1 * | 4/2009 | Kraft et al. | 715/234 |
| 7,533,085 B2 * | 5/2009 | Chang et al. | 707/999.003 |
| 7,546,370 B1 * | 6/2009 | Acharya et al. | 709/227 |
| 7,599,931 B2 * | 10/2009 | Shi et al. | 707/999.004 |
| 8,037,068 B2 * | 10/2011 | Halevy et al. | 707/736 |
| 2006/0129463 A1 * | 6/2006 | Zicherman | 705/26 |
| 2006/0230033 A1 * | 10/2006 | Halevy et al. | 707/3 |

(Continued)

OTHER PUBLICATIONS

Alvarez, Manuel, et al., "Crawling the Content Hidden Behind Web Forms", Lecture Notes in Computer Science, Computational Science and Its Applications—ICCSA 2007, Springer Berlin/ Heidelberg, ISBN 978-3-540-74475-7, vol. 4706/2007, Aug. 2007, 13 pages.

(Continued)

*Primary Examiner* — Pavlan Mamillapalli
(74) *Attorney, Agent, or Firm* — Hickman Palermo Truong Becker Bingham Wong LLP (57) ABSTRACT

Techniques are provided for the efficient location, processing, and retrieval of local product information derived from web pages generally locatable through form queries submitted to web pages often referred to as the "deep" or "hidden" web. In an embodiment, information such as product information and dealer-location information is located on a web page form such as a dealer-locator form. After location of a suitable web page form, editorial wrapping is performed to create an automated information extraction process. Using the automated information extractor, deep-web crawling is performed. A grid-based extraction of individual business records is performed, and matching and ingestion are performed in conjunction with a business listing database. Finally, metadata tags are added to entries in the business listing database. Metadata tags also may be added to entries in other databases.

20 Claims, 6 Drawing Sheets

(56) References Cited

U.S. PATENT DOCUMENTS

| | | | |
|---|---|---|---|
| 2007/0022085 A1* | 1/2007 | Kulkarni | 707/1 |
| 2007/0143263 A1* | 6/2007 | Agrawal et al. | 707/3 |
| 2007/0208703 A1* | 9/2007 | Shi et al. | 707/3 |
| 2008/0040327 A1* | 2/2008 | Chang et al. | 707/3 |
| 2008/0097958 A1* | 4/2008 | Ntoulas et al. | 707/2 |
| 2008/0195567 A1 | 8/2008 | Chen et al. | |
| 2008/0259084 A1* | 10/2008 | Chang et al. | 707/102 |
| 2009/0119157 A1 | 5/2009 | Dulepet | |
| 2009/0119275 A1 | 5/2009 | Chen et al. | |
| 2009/0204610 A1* | 8/2009 | Hellstrom et al. | 707/5 |
| 2011/0202361 A1* | 8/2011 | Firminger et al. | 705/2 |

OTHER PUBLICATIONS

Alvarez, Manuel, et al., "Crawling Web Pages with Support for Client-Side Dynamism", Lecture Notes in Computer Science, Advances in Web-Age Information Management, Springer Berlin/Heidelberg, ISBN 978-3-540-35225-9, Jun. 2006, 11 pages.

Ciravegna, Fabio, et al., "Integrating Informatioon to Bootstrap Information Extraction from Web Sites", in IJCAI 2003 Workshop on Intelligent Information Integration, 2003, 6 pages.

Mundluru, Dheerendranath, et al., "Experiences in Crawling Deep Web in the Context of Local Search", ACM, Workshop on Geographic Information Retrieval, Proceedings of the $2^{nd}$ international workshop on Geographic information retrieval, ISBN # 978-1-60558-253-5, 2008, 8 pages.

Liu, Bing, et al., "Mining Data Records in Web Pages", ACM, Proceedings of the ninth ACM SIGKDD international conference on Knowledge discovery and data mining, ISBN 1-58113-737-0, 2003, 6 pages.

He, Bing, et al., "Accessing the Deep Web—Attempting to locate and quantify material on the Web that is hidden from typical search techniques", Communications of the ACM, vol. 50, Issue 5, May 2007, ACM at sixty: a look back in time, ISSN: 0001-0782, 7 pages.

Simon, Kai, et al., "ViPER: Augmenting Automatic Information Extraction with Visual Perceptions", Conference on Information and Knowledge Management, Proceedings fo the $14^{th}$ ACM international conference on Information and knowledge management, ISBN: 1-59593-140-6, 2005, 8 pages.

Taiwanese Office Action; TW Application No. 099134905, dated Jun. 21, 2013, 13 pages.

Claims from TW Application No. 099134905, dated Jun. 21, 2013, 6 pages.

U.S. Appl. No. 12/615,243, filed Nov. 9, 2009, Final Office Action, Apr. 23, 2012.

Taiwan Intellectual Property Office, "Examination Opinions" in application No. 99134905, dated Mar. 25, 2014, 4 pages.

Current Taiwan Claims in application No. 99134905, dated Mar. 2014, 4 pages.

* cited by examiner

FIG. 6

METHOD AND SYSTEM FOR FORM-FILLING CRAWL AND ASSOCIATING RICH KEYWORDS

CROSS-REFERENCE TO RELATED APPLICATIONS

This application is related to application Ser. No. 12/408,450, filed Mar. 20, 2009, entitled "Apparatus And Methods For Concept-Centric Information Extraction."

FIELD OF THE INVENTION

The present invention relates to crawling and indexing web pages.

BACKGROUND

As business pundits became aware of the amazing varieties of electronic commerce fostered by the Internet and World Wide Web, these pundits spread dire predictions of the death of the so-called "brick-and-mortar" stores. But ordinary computer users, possibly unaware of these predictions, found new ways to incorporate on-line searching into old-fashioned shopping habits.

Now shoppers may include on-line searches prior to making an "off-line" shopping trip to a local retailer. These shoppers use on-line searches to hunt for store directions, hours of operation, and user reviews of the retail experience. These shoppers often also use on-line searches to gather information regarding target products or services. Unfortunately, many shoppers waste time and resources in an attempt to search for retailers by products sold or services provided, as the search results fail to connect the seller, the product or the service, and the location in a meaningful fashion.

For example, a shopper may desire to use a search engine to locate local establishments that sell Viking-brand cooking ranges, in what may be called a 'buy near me' search. However, a search performed by a standard search engine using the search terms "viking" and "range" may locate an odd assortment of establishments that retail costumes, sell ice cream, or repair appliances. These establishments may have little or no physical proximity to the shopper. The shopper must then weed through search results of dubious value.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for the efficient location, processing, and retrieval of local product information derived from web pages generally locatable through form queries submitted to web pages often referred to as the "deep" or "hidden" web. These techniques promote an improved search experience for a user desiring relevant product and business information local to the user, or with respect to any location selected by the user.

In an embodiment, information, such as product information and dealer-location information, is located on a web page form such as a dealer-locator form. After location of a suitable web page form, editorial wrapping is performed to create an automated information extraction process. Using the automated information extractor, deep-web crawling is performed. A grid-based extraction of individual business records is performed, and matching and ingestion are performed in conjunction with a business listing database. Finally, metadata tags are added to entries in the business listing database. Metadata tags also may be added to entries in other databases.

In an embodiment, a business record from the hidden web data extraction is compared to one or more records from the business listing database. In an embodiment, information such as name, address, and telephone number of the extracted business record is compared to corresponding information from the business listing database.

Example Crawler Flow

Figure 1:
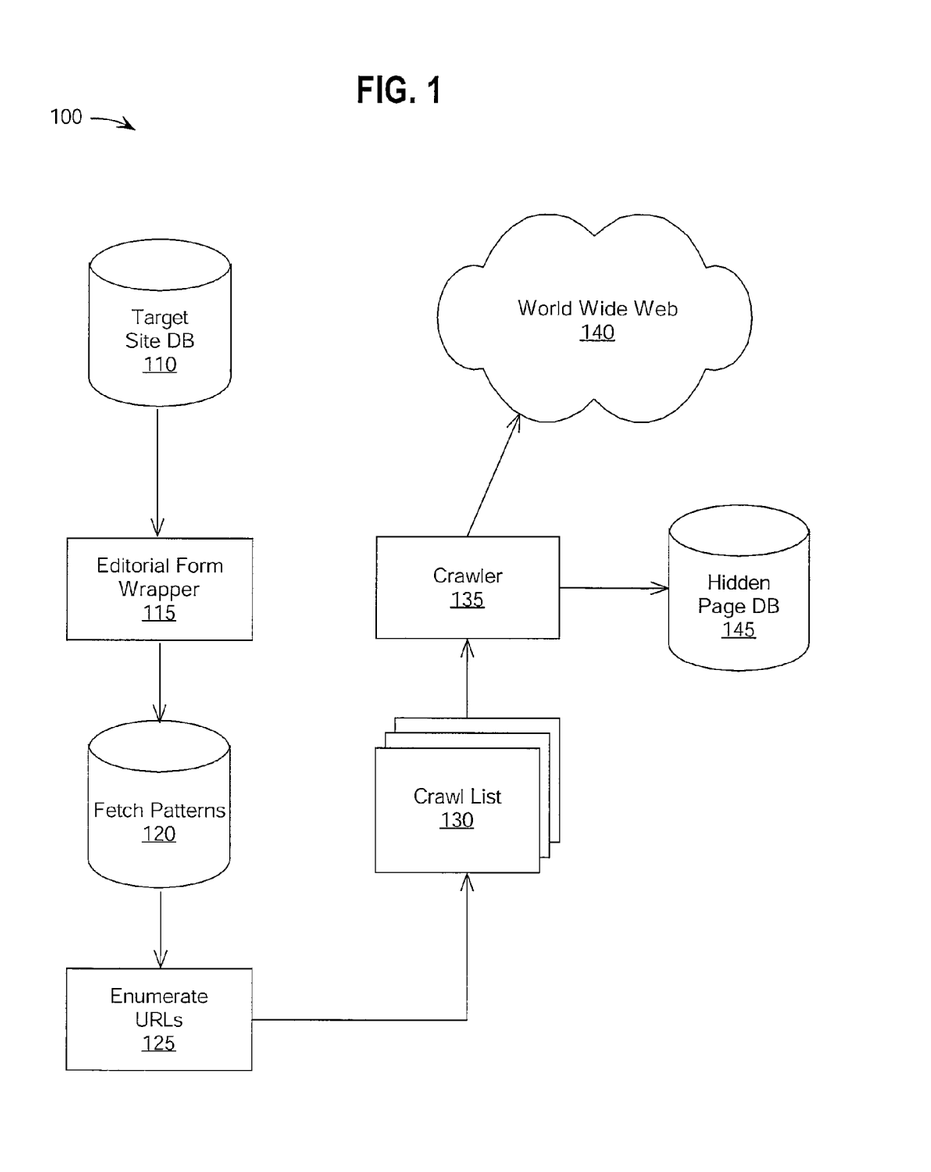
FIG. 1 depicts a page crawler flow for use in the population of a hidden page database.

FIG. 1 depicts a page crawler flow 100 used in the population of a hidden page database. Page crawler flow 100 includes target site database 110, editorial form wrapper 115, fetch patterns database 120, enumerate URLs module 125, crawl list 130, crawler 135, and hidden page database 145.

Figure 2:
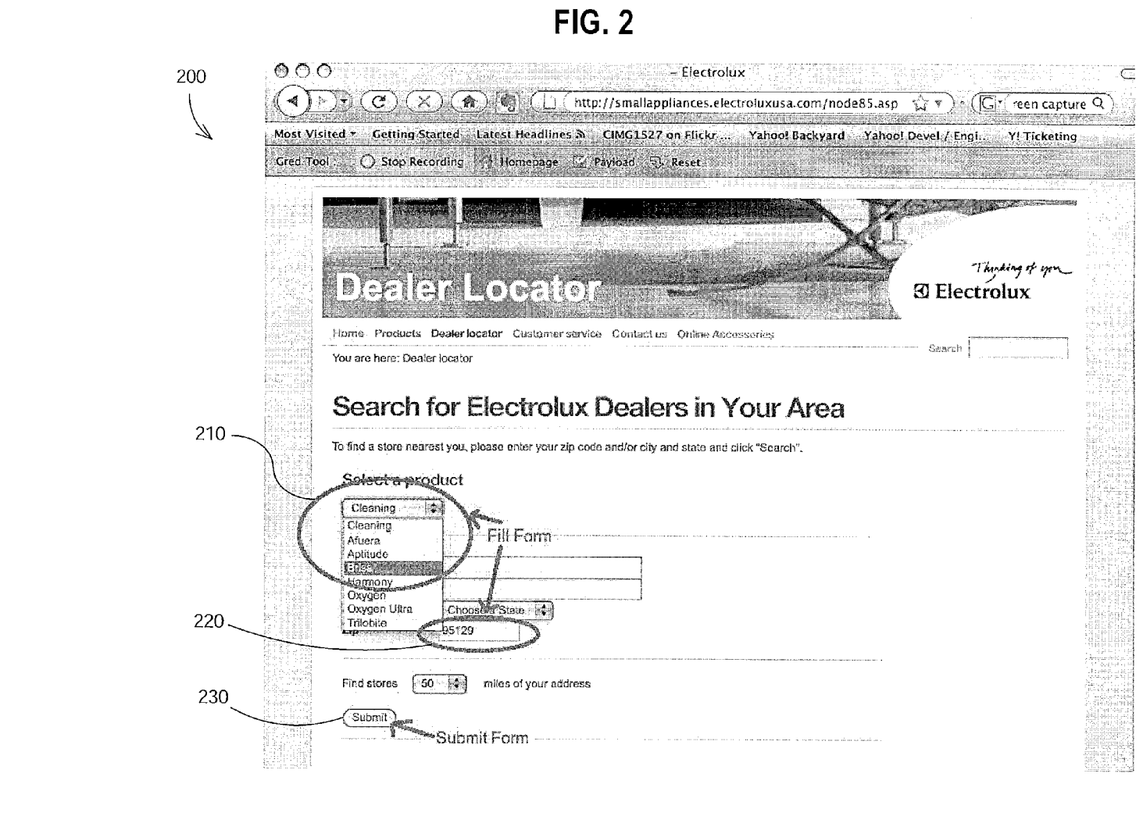
FIG. 2 depicts a dealer-locater form web page having form inputs.

Page crawler flow 100 begins with an entry taken from target site database 110 containing information regarding dealer-locator web pages. For example, an entry in target site database 110 may contain information regarding the link: http://smallappliances.electroluxusa.com/node85.asp, (the "target web site"), corresponding to a dealer-locator page for appliances manufactured under the "Electrolux" brand. FIG. 2 depicts the dealer-locator web page 200 corresponding to this link. Information in target site database 110 may be compiled manually or compiled automatically through various crawling procedures.

As shown in FIG. 2, a user desiring to find an Electrolux dealer in the user's area must fill out form input information including product 210 and zip code 220. Some form information input may contain default values that the user may overwrite. Once product 210 and zip code 220 are selected, the user may activate submit button 230 to generate form results corresponding to the input information selected.

Thus, harvesting of all relevant dealer-locator information could be performed by a hardy user capable of performing repeated query operations at the target web site, with the user submitting varied form input, one product type and zip code at a time. Instead, with respect to FIG. 1, as part of page crawler flow 100, an editor takes information in target site database 110 for input into editorial form wrapper 115. Editorial form wrapper 115 is a tool used to generate all possible fetch patterns stored in fetch patterns database 120.

In an embodiment, editorial form wrapper 115 is a browser plug-in combined with a small PHP web application. The plug-in is able to capture any user input on a form page based on "observing" the user's interaction with the form. To wrap a particular form, such as the example shown in FIG. 2, the editor first opens the home page of the business, starts "recording" and marks the page as the homepage using toolbar buttons. Then the editor navigates to the locator form on the site and fills in the form elements such as product 210 and zip code 220. These values are submitted to the form website, which retrieves a list of store locations.

Once the form is submitted and a result page is returned, the editor may stop recording the session. At this point, the plug-in may present, to the editor, the information captured by the plug-in, such as the business name, the homepage URL, the form page URL and candidate "fetch URLs"—web requests that are submitted during the session and that appear to contain parameters from the user's interaction. Once the editor verifies this information to be correct, the information is submitted to a PHP server (not shown in FIG. 2).

The server processes the form page contents and the user actions on the form to determine the form parameters which have been filled in by the user. The server may identify the zip code parameter, if found, and identify other form parameters along with their dictionaries suitable for iteration, as shown in FIG. 3, as part of the population of fetch patterns database 120.

Figure 3:
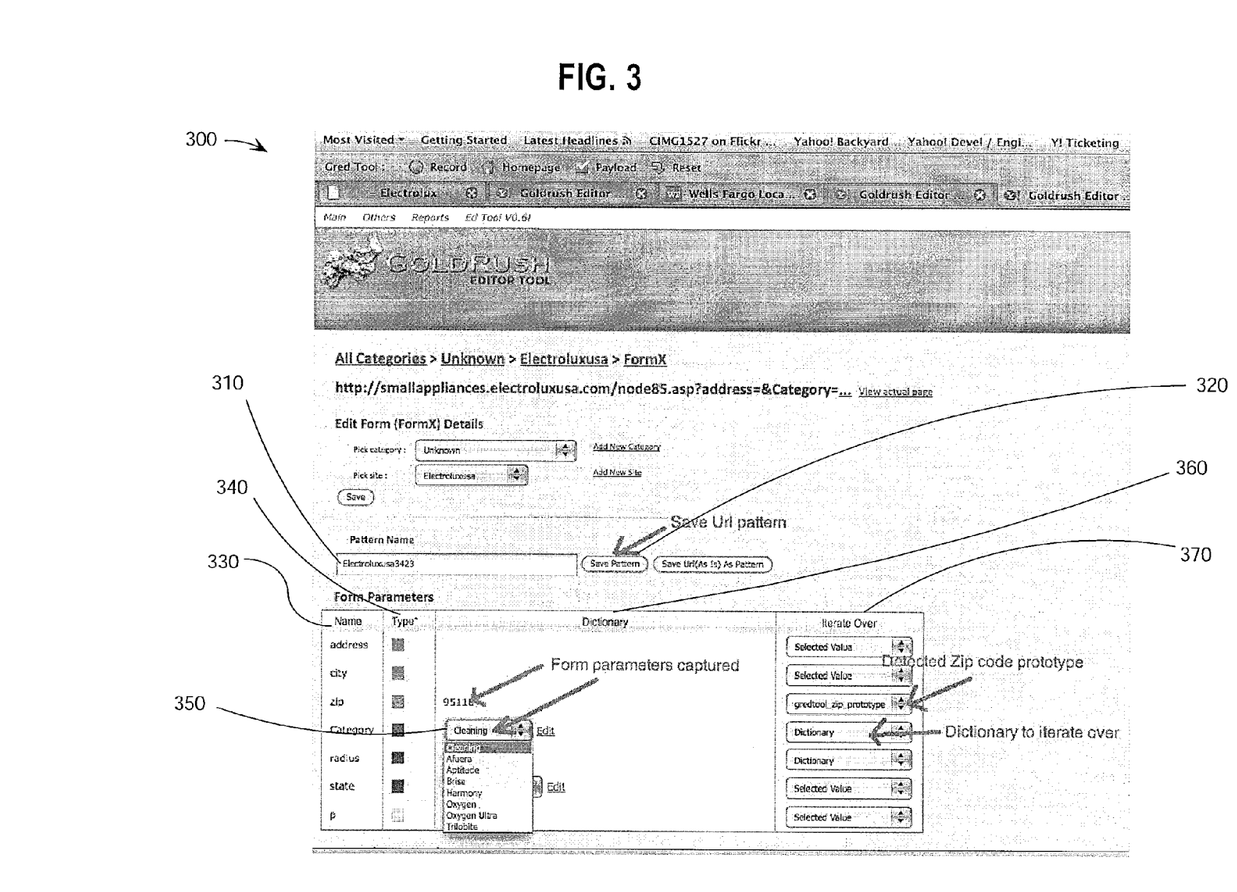
FIG. 3 depicts an editorial form wrapper application input screen for use by an editor to populate a fetch patterns database.

FIG. 3 depicts an editorial form wrapper input screen 300 generated by the PHP web application for use by the editor to populate fetch patterns database 120. Using text input box 310 and one or more save buttons 320, the editor may assign a name to the particular pattern to be used in the enumeration of URLs at step 125. Column 330 lists the name of each form parameter found, with corresponding form parameter values found in dictionary column 350. For example, parameter box 350 displays all possible values captured for the form parameter "Category," beginning with the value "Cleaning" and ending with the value "Trilobite." The editor may select the values to be iterated over during enumeration of URLs through values selected in iteration column 370.

If there are any lists on the form which should remain fixed throughout the crawl, such as a list of allowed radius values for search, then the editor may change those to 'Selected Value' to indicate that those parameters need not be iterated over. For example, in FIG. 3 the editor has decided that no iteration over the form parameters "address," "city," "state," and "p" is necessary, whereas the form parameter "zip" shall be iterated over using values taken from a file named "gredtool_zip_prototype." Similarly, as shown in FIG. 3, the editor has decided to iterate over all possible values of the form parameter "Category."

Upon review of the parameters, the editor may save a fetch-pattern in fetch pattern database 120. The fetch-pattern is used to generate URLs to crawl at step 125. The browser-based approach offers many benefits. For example, the browser-based approach allows extremely fast wrapping of simple forms, taking only a few minutes of an editor's time. Additionally, generating URLs from fetch patterns may be easily incorporated into an existing crawler framework in which the crawler is configured to issue http requests. This approach requires less resources as compared to a configuration in which no URLs are generated and browser simulation-based techniques are used to get page content. Further, the editor tool may be easily configured for other applications outside of brick-and-mortar shopping, such as filling forms to crawl health care provider websites or product manuals offered on-line via form submission.

As a non-limiting example, a fetch pattern for the fillable form located at the website "brand.com" may have a format of:
http://brand.com/?zip=$Z&cat=$C,
where $Z and $C each point to a dictionary of values for zip codes and product-categories, with the resulting list of fetch-URLs including all {zip code, product category} combinations; a sample entry in the resulting crawl list may be:
http://brand.com/?zip=95110&cat=Kitchen, Such a resulting list of fetch-URLs is placed in crawl list 130 and used as input to crawler 135. With respect to the example illustrated FIGS. 2, 3, and 5 and the discussion below, the entry in the resulting crawl list may be:
http://smallappliances.electroluxusa.com/
node85.asp?zip=95129&cat=Brisa,
corresponding to a search for Electrolux appliance dealers that located in or near zip code 95129 and that sell the "Brisa" product line.

In an embodiment, the dictionary of values for zip codes corresponds to all known valid zip codes; currently, the number of valid zip codes is approximately 42,000. In an embodiment, the set of zip codes in the dictionary is selected based at least in part on characteristics of the product, product manufacture, or service. For example, valid zip codes outside the area of a known region may be omitted for a search of locations of a regional restaurant chain.

Once crawl list 130 is formed, crawler 135 crawls web sites in World Wide Web 140 using crawl list 130, with results placed in hidden page database 145. Extraction of information from hidden page database 145 is now discussed below.

Example Extraction and Matching

Figure 4:
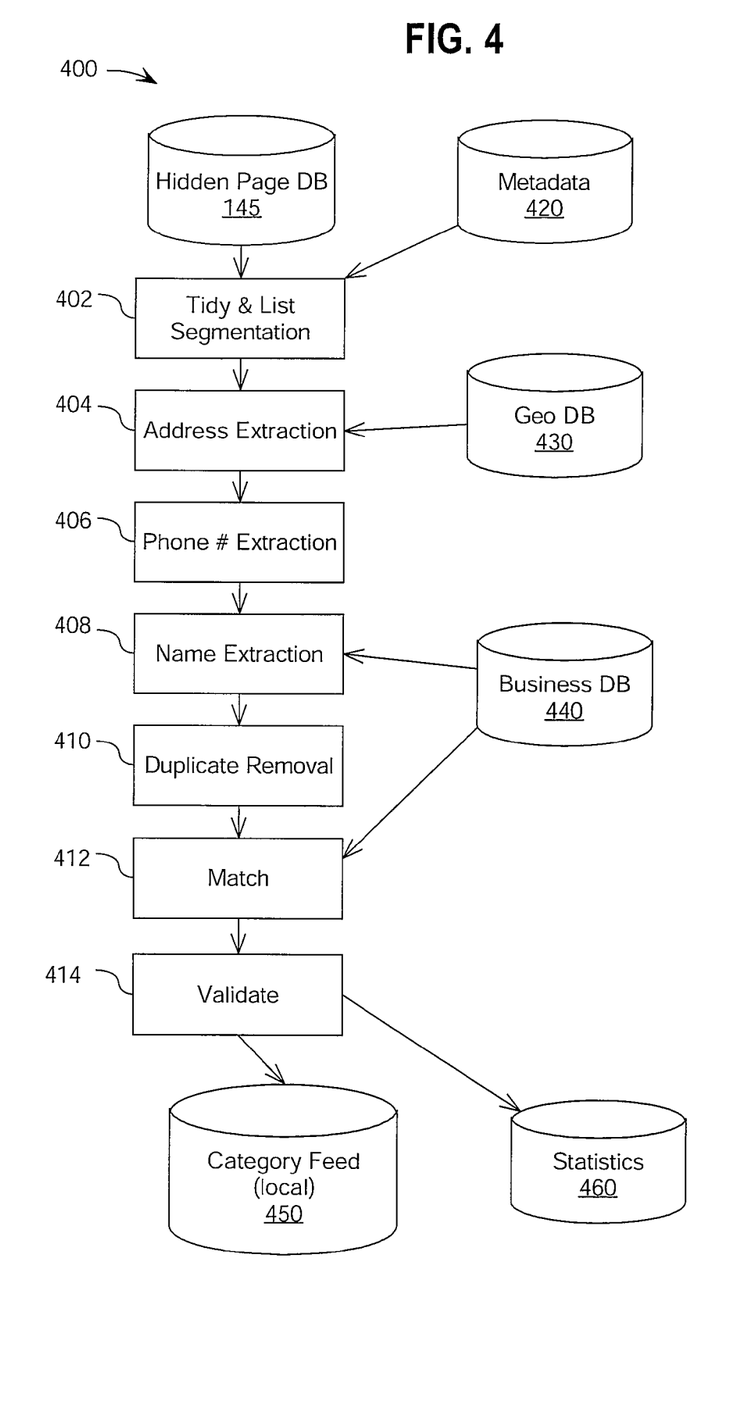
FIG. 4 depicts a listing extraction flow for extracting information corresponding to a single fetch pattern from crawled pages stored in a hidden page database.

Once hidden page database 145 is populated, business listings are extracted. FIG. 4 depicts a listing extraction flow for extracting information corresponding to a single fetch pattern from crawled pages stored in hidden page database 145. Techniques of performing adaptive list matching are additionally described in the related application entitled "Apparatus And Methods For Concept-Centric Information Extraction," application Ser. No. 12/408,450, filed on Mar. 20, 2009.

Information regarding a particular product, such as an appliance, may be spread out over several fetch patterns, as information such as service location may use a separate form apart from the form used to locate dealer information. Although FIG. 4 depicts extraction corresponding to a single fetch pattern, crawled pages in hidden page database 145 corresponding to multiple fetch patterns may be processed concurrently so as to maximize the amount of information extracted, and to increase the robustness of the information extraction from defects such as typographical errors contained in the crawled pages. Additional advantages of performing extraction using multiple fetch patterns in parallel may include ease of scaling and a decrease in processing time. An example of concurrent processing may be the concurrent processing of both a fetch pattern corresponding to retailers and a fetch pattern corresponding to repair facilities.

Figure 5:
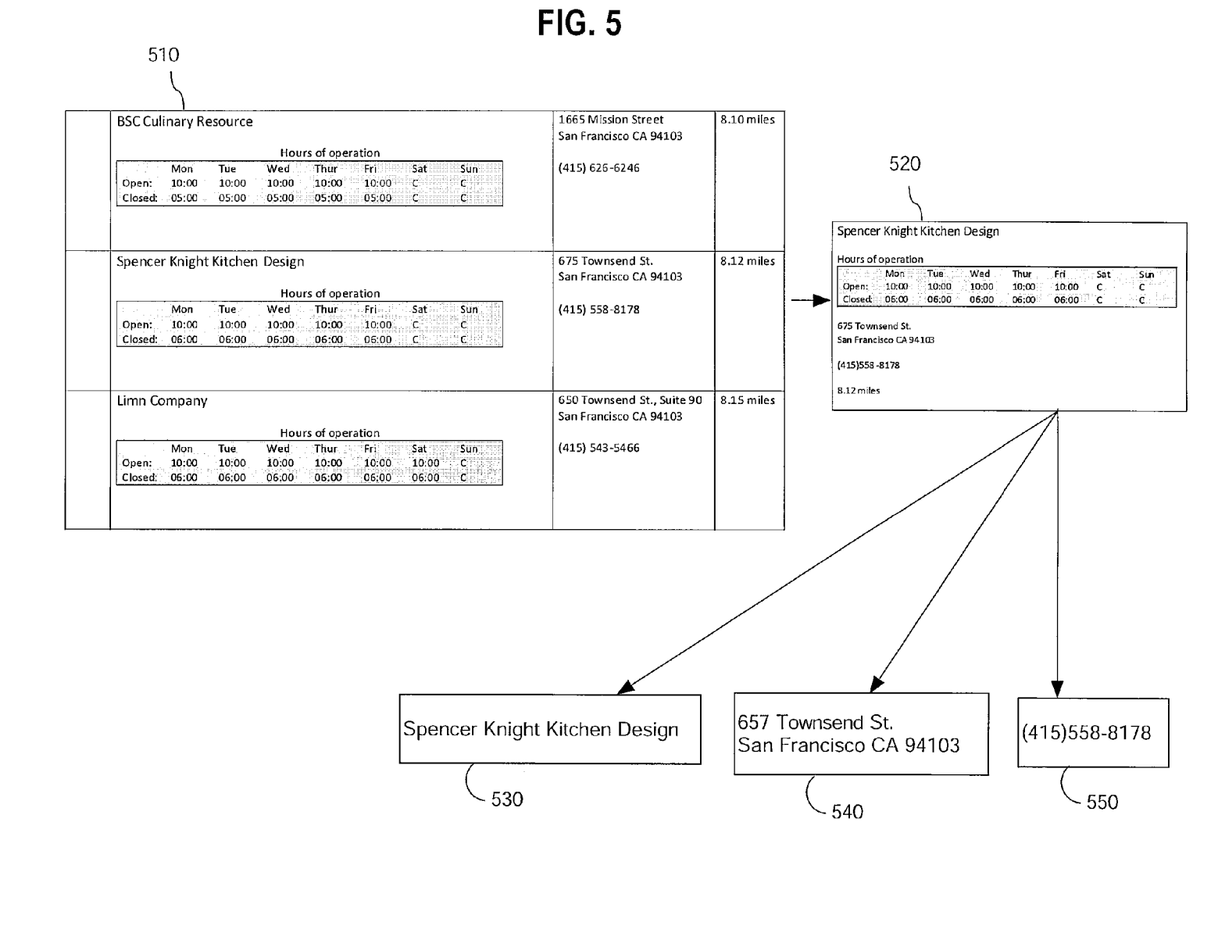
FIG. 5 depicts the transformation of information stored in hidden page database first into list segments, and then into extracted records.

FIG. 5 depicts the transformation of information stored in hidden page database 145 into list segments, and then into extracted records. Form information 510 is a non-limiting example of a portion of a web page crawled by crawler 135 and stored in hidden page database 145. For example, the form information may contain raw HTML data and graphics data, which, when rendered by a browser, would appear to the user substantially as the table shown as form information 510.

With respect to FIG. 4, extraction begins at step 402, in which web page data corresponding to a selected fetch URL pattern is input from hidden page database 145. Metadata from metadata database 420 may also be input. In an embodiment, metadata is added to entries during population of hidden page database 145.

In an embodiment, metadata corresponding to the type of business, product, or service is added to the web page data, for use in tagging the resulting business records with information relevant to the search engine user; for example, the tag "repair" may be added to business records from crawling a web site of a product's authorized repair establishments. Similarly, a set of tags corresponding to product brands repaired by a particular authorized repair establishment may be added to the business records.

In step 402, extraneous information, such as graphics and special characters, are removed from the data and the resulting tidied pages are segmented into extracted records. Each extracted record corresponds to a single business from which individual list items will be extracted. For example, a single extracted record may comprise one or more of the following: extracted name, extracted address, and extracted phone number. With respect to FIG. 5, a depiction of a sample extracted record appears as extracted record 520. Extracted record 520 corresponds to a single business location from form information 510.

Other extractions, corresponding to the type of web site information crawled, are possible. For example, with respect to performing extraction on a user manual, a single extracted record may comprise items such as extracted index, extracted warranty, extracted parts list, and extracted assembly instructions. Similarly, with respect to performing extraction on a hidden database of health care providers, a single extracted record may comprise items such as medical doctor's name, address, list of specialties, and education.

For each extracted record, at step 404 address information is extracted. In an embodiment, fields including street number, street name, city, zip code and state are extracted. In an embodiment, field values are compared to geographic database 430 containing geographic information, from which a latitude and longitude are obtained for the address.

Phone number extraction is performed at step 406. In an embodiment, a set of regular expressions that identify telephone numbers in various United States and international formats, are applied. In an embodiment, a similar extraction to locate facsimile telephone numbers is performed.

Name extraction is performed at step 408 using an auto-trained name wrapper in which extracted records from a particular fetch URL are compared to business listing information found in business database 440. In an embodiment, business database 440 comprises a business database formed through a conventional crawl of web pages.

The wrapper is auto-trained by locating name matches between the extracted records and the business database 440. In an embodiment, all extracted records are compared against business database 440. In an embodiment, a candidate pool of extracted records is formed by searching all extracted records against business database 440 based upon matching address or telephone information, followed by comparison of the candidate pool of extracted records against business database 440 for matching business names.

A set of positive examples is formed using the set of successful matches between the extracted records and matching names in business database 440. This set of positive examples is then used to auto-train a name wrapper. Then this name wrapper is run against all extracted records to extract names for all extracted records.

After name extraction is performed on all extracted records, it is likely the results include many duplicate records. For example, a store located in a particular zip code will likely appear in results from a fetch URL corresponding to an adjacent zip code, as most forms return store locations within a particular radius of distance from the input zip code. Duplicates are removed at step 410. In an embodiment, duplicates are removed by performing an exact match on extracted name, address, and telephone information.

Final matching of each (de-duped) extracted record is performed at step 412. In an embodiment, each record is compared against business database 440 to determine a match score. In an embodiment, a match score is based upon a fuzzy match using the business name attribute, and exact matches on the address and telephone attributes. A match score above a selected threshold value is determined to have resulted in a successful match. In an embodiment, for a successful match in which the business name attribute does not exactly match the business name appearing in business database 440, the business name appearing in business database 440 is used as the business name attribute.

Editorial validation of both matched and unmatched records is performed at step 414. In an embodiment, a random sample of matched and unmatched records is selected for validation. Upon successful validation, a feed of extracted records is placed in category feed 450 and feed summary statistics are placed in statistics database 460. In an embodiment, additional metadata, either supplied by metadata 420 or supplied by a separate source, is included with extracted records placed in category feed 450. In an embodiment, records placed in category feed 450 are used to augment corresponding records in business database 440.

While in one embodiment the business listings may be stored in a database (as described above), in alternative embodiments, the business listings may be stored in other kinds of data repositories, including repositories that are not databases.

With respect to FIG. 5, the final record placed in category feed 450 includes business name 530 having value "Spencer Knight Kitchen Design", address 540 having value "657 Townsend St., San Francisco, Calif. 94103," and telephone 550 having value "(415)558-8178." Although not shown in FIG. 5, metadata tags attached to one or more of business name 530, address 540, and telephone 550 may have values such as "Electrolux," "dealer," and "Brisa." Information from category feed 450 could then be transferred into business database 440. Thus a search engine user issuing a search query "Brisa dealer" to one or more databases including business database 440 could easily obtain the desired local dealer information without having to wade through extraneous materials.

Although the process above is detailed with reference to name, address, and telephone information, other types of information may be extracted from hidden page database 145.

For example, form results that could be extracted using the techniques described above include hours of operation, holidays, and parking information. Form results extracted for food establishments could include food types and menus. As described earlier, these techniques may also be extended into the automated indexing of hidden web sites corresponding to product manual information or medical provider databases. Additionally, these techniques may be used to index hidden web pages into a regular search engine. For example, a "store details" web page previously accessible only through a form web page could be indexed in a search engine database in order to make the store details web page locatable through a standard search query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
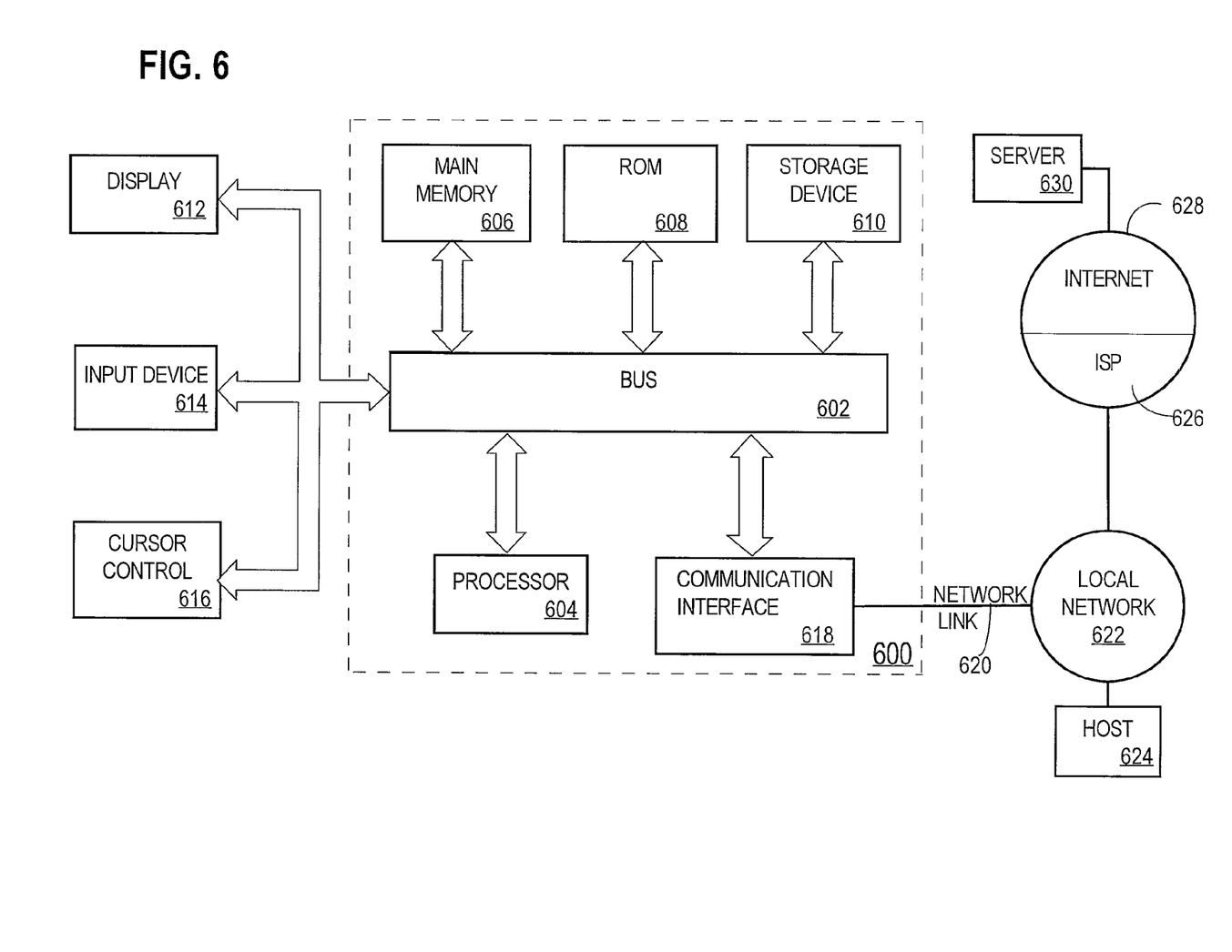
FIG. 6 depicts a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    automatically observing user interaction with a particular web form;
    producing one or more URL fetch patterns corresponding to the particular web form based, at least in part, on the observed user interaction;
    generating a first URL, based, at least in part, on the one or more URL fetch patterns, wherein the first URL includes a first value for a particular parameter associated with the particular web form;
    automatically crawling the first URL to obtain a first record;
    automatically extracting business information from the first record;
    applying one or more tags, based on the business information, to an entry in a business listing database;
    generating a second URL, based, at least in part, on the one or more URL fetch patterns, wherein the second URL includes a second value for the particular parameter;
    wherein the second value is distinct from the first value;
    automatically crawling the second URL to obtain a second record; and
    automatically extracting second business information from the second record;
    wherein the method is performed by one or more computing devices.

2. The method of claim 1, further comprising:
    automatically comparing said first record to a third record from the business listing database;
    based on the comparison, automatically determining whether the first record and the third record both describe an identical business.

3. The method of claim 1, wherein said producing one or more URL fetch patterns corresponding to the particular web form based, at least in part, on the observed user interaction further comprises:
    automatically processing the observed user interaction and one or more candidate fetch URLs that are submitted as a result of the observed user interaction to determine a particular template URL for the particular web form and a set of parameters included in the particular template URL;
    wherein the set of parameters includes the particular parameter;
    identifying a particular dictionary for the particular parameter;
    wherein the first value for the particular parameter is indicated by the particular dictionary.

4. The method of claim 3, wherein said identifying the particular dictionary further comprises:
    receiving, via a control associated with the particular parameter on a graphical user interface, information that identifies the particular dictionary; and
    associating the particular dictionary with the particular parameter.

5. The method of claim 1, wherein the business listing database is constructed using a web crawler.

6. The method of claim 1, wherein the one or more tags are used to identify results of a search query performed using the business listing database.

7. The method of claim 1, further comprising modifying, based, at least in part, on the business information extracted from at least the first record, information in one or both of (1) the business listing database, and (2) a search engine database.

8. The method of claim 1, wherein at least one tag of the one or more tags comprises a product brand name and the one or more tags describe (1) products for sale, or (2) services performed by a business having the entry in the business listing database.

9. The method of claim 1, further comprising:
    receiving information identifying a set of one or more values, for the particular parameter, to be included in generated URLs;
    wherein the first and second values are included in the set of one or more values.

10. A computer-implemented method comprising:
    automatically populating one or more fields of a form on a first web page that is used to locate stores that carry products that belong to a particular brand;
    receiving, in response to a submission of said form, one or more records that indicate one or more geographical locations of stores that each carry products that belong to said particular brand;
    locating, within a business listing repository, and based on first contact information that is contained in a first record of said one or more records, a second record that contains second contact information that matches said first contact information;

wherein said second contact information was extracted from a second web page by an automated web crawler that automatically follows hyperlinks between web pages;
storing data that associates said particular brand with said second record;
receiving a query that indicates both (a) a particular geographical location and (b) said particular brand;
in response to receiving said query, determining, based at least in part on said data, that said second record is associated with both (a) said particular geographical location and (b) said particular brand; and
in response to determining that said second record is associated with both (a) said particular geographical location and (b) said particular brand, generating a search results web page that contains at least a portion of said second contact information from said second record;
wherein the method is performed by one or more computing devices.

11. One or more non-transitory computer readable media storing instructions which, when executed by one or more computing devices, cause:
automatically populating one or more fields of a form on a first web page that is used to locate stores that carry products that belong to a particular brand;
receiving, in response to a submission of said form, one or more records that indicate one or more geographical locations of stores that each carry products that belong to said particular brand;
locating, within a business listing repository, and based on first contact information that is contained in a first record of said one or more records, a second record that contains second contact information that matches said first contact information;
wherein said second contact information was extracted from a second web page by an automated web crawler that automatically follows hyperlinks between web pages;
storing data that associates said particular brand with said second record;
receiving a query that indicates both (a) a particular geographical location and (b) said particular brand;
in response to receiving said query, determining, based at least in part on said data, that said second record is associated with both (a) said particular geographical location and (b) said particular brand; and
in response to determining that said second record is associated with both (a) said particular geographical location and (b) said particular brand, generating a search results web page that contains at least a portion of said second contact information from said second record.

12. One or more non-transitory computer readable media storing instructions which, when executed by one or more computing devices, cause:
automatically observing user interaction with a particular web form;
producing one or more URL fetch patterns corresponding to the particular web form based, at least in part, on the observed user interaction;
generating a first URL, based, at least in part, on the one or more URL fetch patterns, wherein the first URL includes a first value for a particular parameter associated with the particular web form;
automatically crawling the first URL to obtain a first record;
automatically extracting business information from the first record;
applying one or more tags, based on the business information, to an entry in a business listing database;
generating a second URL, based, at least in part, on the one or more URL fetch patterns, wherein the second URL includes a second value for the particular parameter;
wherein the second value is distinct from the first value;
automatically crawling the second URL to obtain a second record; and
automatically extracting second business information from the second record.

13. The one or more non-transitory computer readable media of claim 12, further comprising instructions for:
automatically comparing said first record to a third record from the business listing database;
based on the comparison, automatically determining whether the first record and the third record both describe an identical business.

14. The one or more non-transitory computer readable media of claim 12, wherein said producing one or more URL fetch patterns corresponding to the particular web form based, at least in part, on the observed user interaction further comprises:
automatically processing the observed user interaction and one or more candidate fetch URLs that are submitted as a result of the observed user interaction to determine a particular template URL for the particular web form and a set of parameters included in the particular template URL;
wherein the set of parameters includes the particular parameter;
identifying a particular dictionary for the particular parameter;
wherein the first value for the particular parameter is indicated by the particular dictionary.

15. The one or more non-transitory computer readable media of claim 14, wherein said identifying the particular dictionary further comprises:
receiving, via a control associated with the particular parameter on a graphical user interface, information that identifies the particular dictionary; and
associating the particular dictionary with the particular parameter.

16. The one or more non-transitory computer readable media of claim 12, wherein the business listing database is constructed using a web crawler.

17. The one or more non-transitory computer readable media of claim 12, wherein the one or more tags are used to identify results of a search query performed using the business listing database.

18. The one or more non-transitory computer readable media of claim 12, further comprising instructions for modifying, based, at least in part, on the business information extracted from at least the first record, information in one or both of (1) the business listing database, and (2) a search engine database.

19. The one or more non-transitory computer readable media of claim 12, wherein at least one tag of the one or more tags comprises a product brand name and the one or more tags describe (1) products for sale, or (2) services performed by a business having the entry in the business listing database.

20. The one or more non-transitory computer readable media of claim 12, further comprising instructions for:
receiving information identifying a set of one or more values, for the particular parameter, to be included in generated URLs;

wherein the first and second values are included in the set of one or more values.

* * * * *